W. J. & W. F. WEAVER.
FOUR WHEEL DRIVE TRACTOR.
APPLICATION FILED AUG. 16, 1916.
1,263,973.
Patented Apr. 23, 1918.
2 SHEETS—SHEET 2.
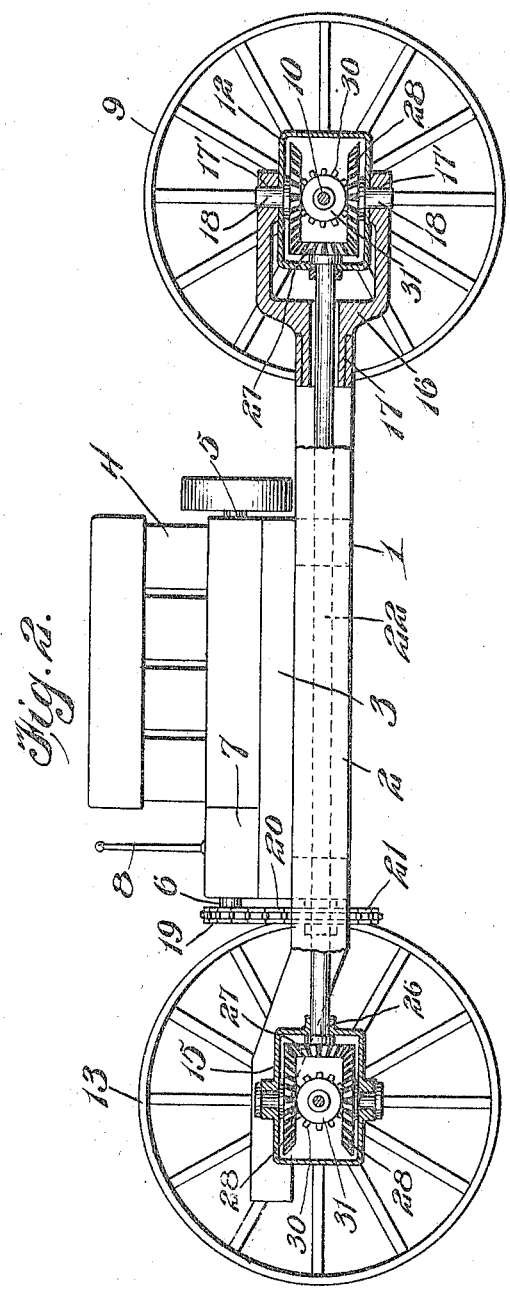
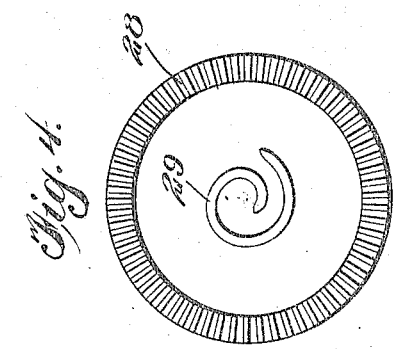
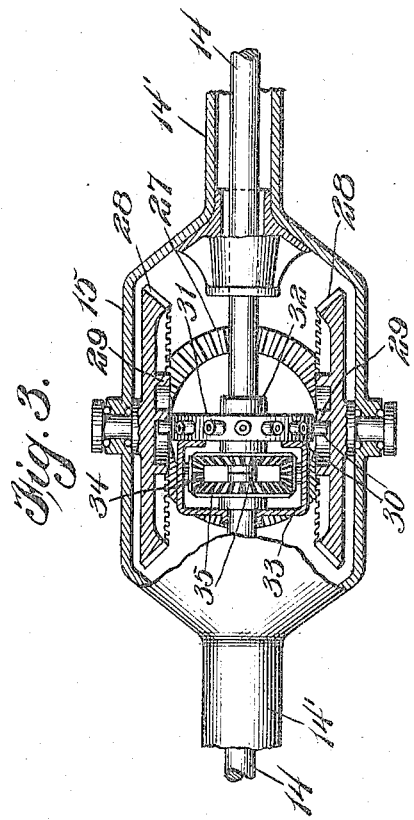
Witnesses
J. R. Heinrichs
Inventors
W. J. Weaver
W. F. Weaver
By Victor J. Evans
Attorney

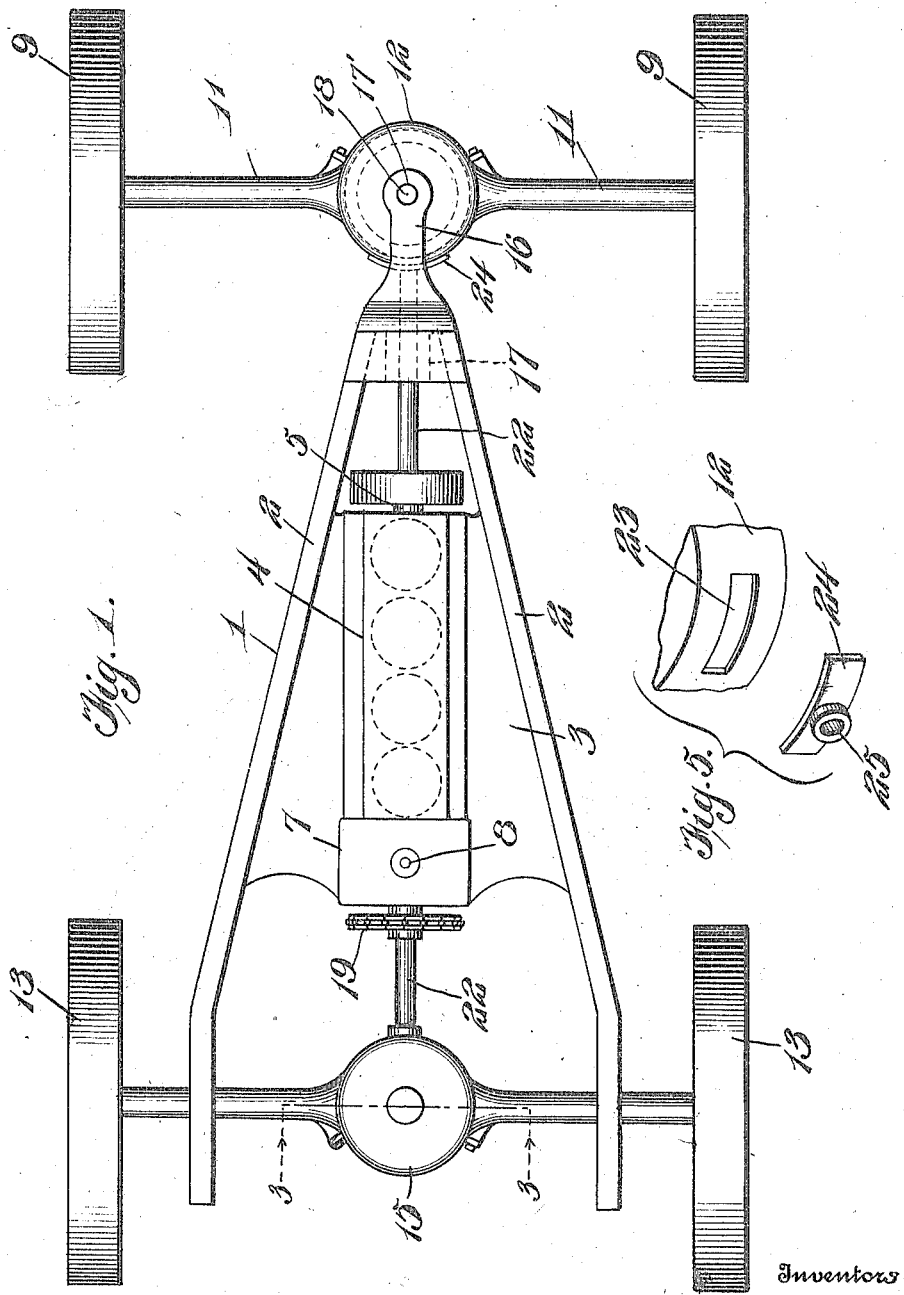

UNITED STATES PATENT OFFICE.

WILLARD J. WEAVER AND WALTER F. WEAVER, OF STERLING, ILLINOIS.

FOUR-WHEEL-DRIVE TRACTOR.

1,263,973.           Specification of Letters Patent.       Patented Apr. 23, 1918.

Application filed August 16, 1916. Serial No. 115,246.

*To all whom it may concern:*

Be it known that we, WILLARD J. WEAVER and WALTER F. WEAVER, citizens of the United States, residing at Sterling, in the county of Whiteside and State of Illinois, have invented new and useful Improvements in Four-Wheel-Drive Tractors, of which the following is a specification.

This invention relates to tractors, and particularly to drive gearing for tractors of the four-wheel-drive type.

The primary object of the invention is to provide a four-wheel-drive tractor embodying novel means for driving all four wheels simultaneously at the same normal rate of speed.

Another object is to provide a four-wheel-drive tractor wherein provision is made for transmitting constant motion to the wheels while permitting the wheels of each set to have vertical play to compensate for irregularities of road surface and also to have differential motion for obvious purposes.

A still further object of the invention is to provide a novel construction of gearing for driving the sets of wheels from a common power plant and for obtaining positive traction at all times from all of the vehicle wheels in addition to the advantages above stated.

With these and other objects in view the invention consists of the features of construction, combination and arrangement of parts hereinafter fully described and claimed, reference being had to the accompanying drawings in which:—

Figure 1 is a top plan view of the frame or chassis of a tractor embodying our invention.

Fig. 2 is a side elevation of the same, with parts appearing in section.

Fig. 3 is a vertical transverse section on the line 3—3 of Fig. 1 through the rear differential and compensating gearing.

Fig. 4 is an inner face view of one of the combined power transmitting and compensating gears.

Fig. 5 is a detail view illustrating a feature of construction.

Referring to the drawing, 1 designates a frame of the three-point suspension type, said frame being preferably V-shaped and constructed of angle metal or other suitable material. In the present instance the frame is shown as consisting of forwardly converging side bars 2 intermediately connected by a bed or platform 3, rigidly fixed thereto and forming a support for the driving motor 4. This motor may be any suitable sort of motor, but preferably one of the internal combustion type, the shaft 5 of which transmits motion to a transmission shaft 6 through a suitable type of transmission gearing 7. This transmission gearing may be of any preferred type in common use, and is not specifically shown or described as it constitutes no part of the present invention. In practice a selective type of transmission gearing is preferred, and said gearing is designed to be shifted to its different positions through the action of a controlling lever 8. The front steering and traction wheels 9 are mounted upon the sections 10 of a divided axle, and said axle sections 10, to the outer ends of which the wheels are fixed, are journaled in sleeves or frame arms 11 which are fixed to and projecting outwardly from a casing 12 containing a differential and compensating drive mechanism hereinafter described. The rear traction wheels 13 are similarly fixed to the outer ends of the sections 14 of a divided rear axle which are journaled in sleeves or frame arms 14' fixed to and projecting from a casing 15 generally similar in construction to the casing 12 and also containing a like type of differential and compensating drive mechanism. The sleeves 14' are fixed suitably to the rear ends of the frame bars 2, and hence the rear axle sections are journaled in bearings which are stationary with respect to the frame, but provision is made for connecting the front axle and its gearing with the frame in such a manner as to permit the front wheels to be turned forwardly and rearwardly on a central vertical pivot for steering purposes, and also for permitting the front axle and frame to have relative vertical lateral pivotal motions, so that both sets of wheels may run at different elevations and accommodate themselves to varying irregularities of road surface.

In order to enable this result to be obtained a yoke 16 is provided and has a hollow stem 17 which is suitably swiveled to the forward ends of the frame bars 2 to swing or turn laterally, and the casing 12 is disposed between the bifurcated portion or fork arm of this yoke, which is provided with bearing openings 17' receiving trunnions 18 at the top and bottom of the casing, by means of which the front wheels or front gear casing 12 are permitted to swing forwardly and rearwardly on a vertical axis for steering purposes, and also to swing vertically with the yoke on a horizontal axis laterally in either direction to permit the wheels 9 to travel at different elevations. By this construction it will be observed that the frame and rear wheel may also turn or swing laterally in a vertical plane on the yoke as an axis, so that either one or both sets of wheels may independently or simultaneously adjust themselves to travel over varying irregularities of ground surface, it being understood, of course, that in the lateral movements of the rear wheels the said wheels and the frame will turn as a unit.

The shaft 6 carries a sprocket wheel 19 which is connected by a drive chain 20 with a sprocket wheel 21 on a longitudinally extending secondary drive shaft 22. This shaft 22 extends at its forward end through the yoke stem 17, in which it is journaled, and into the casing 12 through an arcuate slot 23 therein, said slot being normally covered by a sliding bearing plate 24 provided with a bearing sleeve 25 through which the shaft projects, whereby shifting movements of the casing for steering purposes are permitted without disturbing the shaft and without interference therefrom. The rear end of the shaft extends through and is journaled in a bearing opening 26 in the rear differential and compensating gear casing 15, and the front and rear ends of said shaft are provided with beveled drive gears 27 for transmitting driving motion simultaneously to the drive gearings within the respective casings 12 and 15, whereby a constant and uniform driving motion will be simultaneously transmitted to both the front and rear sets of wheels.

The gearing for transmitting motion from the shaft to each set of wheels is similar in construction, so that a description of one set of gearings will suffice for both. Referring then, to the rear set of gearing it will be seen that the beveled drive gear 27 meshes with the beveled-toothed surfaces 28 of a pair of superposed, horizontal combined power transmitting and driving gears, which gears are journaled upon the top and bottom walls of the casing and are provided upon their relatively inner faces with scroll-shaped portions or gear surfaces 29 which engage an annular series of pin or roller teeth 30 upon an intermediate gear member 31 carried by a hub or sleeve 32 loose on one of the shaft sections 14. The gear 31, which rotates about said shaft section 14 as an axis, has fixed thereto a frame or casing 33 of a differential gear mechanism, which is loosely mounted upon the other shaft or axle section 14, and which has journaled thereon the usual differential gear pinions 34 meshing with the differential drive gears 35 on the respective shaft or axle sections, whereby the axle sections will be constantly driven but are permitted to have differential motion to facilitate the turning or steering of the vehicle in the usual way. Hence it will be seen that both sets of wheels will be simultaneously and constantly driven, while the wheels of each set may revolve at varying speeds for a differential action, and the wheels of the front set may be swung as a unit for steering actions. Also it will be seen that provision is made through the swivel connection between the frame and yoke to adapt the wheels of each set to swing upon horizontal longitudinal axes to conform to variations in the level of portions of road surfaces over which they travel, during which they will have a constant tractive engagement with the ground surface, thus increasing the traction power of the device. As the trucks run over uneven surfaces the differential will move with the housing but the pins of the pin-wheel 31 will remain in engagement with the rib 29 so that the axle sections are permitted a certain amount of play, whereby a minimum range of flexibility of the wheels in accommodating themselves to different elevations of road surfaces will be secured.

We claim:—

1. A tractor comprising front and rear sets of traction wheels, a pair of axle sections for each set, differential gearings connecting the sections of each pair together, a pin-wheel loosely mounted on one section and connected with the differential gearings, a beveled wheel, means for driving the same, and a cam member on said wheel with which the pins engage.

2. A tractor comprising front and rear sets of traction wheels, a pair of axle sections for each set, differential gearings connecting said sections together, a pin-wheel loosely mounted on one section and connected with the differential gearings, upper and lower gear wheels each provided with a scroll-shaped gear rib with which the pins engage, and means for driving said upper and lower wheels.

In testimony whereof we affix our signatures.

WILLARD J. WEAVER.
WALTER F. WEAVER.

Witnesses:
HARRY C. KNOX,
ARTHUR H. MUENDER.